(12) United States Patent
Hanna

(10) Patent No.: US 6,660,208 B2
(45) Date of Patent: Dec. 9, 2003

(54) DETOXIFICATION OF SOLID FREEFORM FABRICATION MATERIALS

(75) Inventor: Stephen D. Hanna, Los Angeles, CA (US)

(73) Assignee: 3D Systems, Inc., Valencia, CA (US)

( * ) Notice: Subject to any disclaimer, the term of this patent is extended or adjusted under 35 U.S.C. 154(b) by 285 days.

(21) Appl. No.: 09/822,554

(22) Filed: Mar. 30, 2001

(65) Prior Publication Data

US 2002/0171176 A1 Nov. 21, 2002

(51) Int. Cl.$^7$ .................. B29C 35/08; B29C 41/02; B29C 71/00; B29C 71/02
(52) U.S. Cl. .............. 264/401; 264/232; 264/234; 264/236; 264/308; 264/442; 264/497
(58) Field of Search ................. 264/232, 234, 264/236, 308, 401, 442, 497

(56) References Cited

U.S. PATENT DOCUMENTS

| | | |
|---|---|---|
| 5,143,663 A | 9/1992 | Leyden et al. |
| 5,248,456 A | 9/1993 | Evans, Jr. et al. |
| 5,464,932 A | 11/1995 | Allcock et al. |
| 5,482,659 A | 1/1996 | Sauerhoefer |
| 5,639,413 A | 6/1997 | Crivello |
| 5,674,921 A | 10/1997 | Regula et al. |
| 5,763,503 A | 6/1998 | Cowperthwaite et al. |
| 5,814,161 A | 9/1998 | Sachs et al. |
| 5,855,718 A | 1/1999 | Nguyen et al. |
| 5,869,170 A | 2/1999 | Cima et al. |
| 6,022,311 A | 2/2000 | Juneau et al. |
| 6,076,324 A | 6/2000 | Daily et al. |
| 6,080,343 A | 6/2000 | Kaufman et al. |
| 6,107,008 A | 8/2000 | Howell et al. |
| 6,117,385 A | 9/2000 | Chartoff et al. |
| 6,117,612 A | 9/2000 | Halloran et al. |
| 6,170,560 B1 | 1/2001 | Daily et al. |
| 6,547,994 B1 * | 4/2003 | Monkhouse et al. .... 264/308 X |

FOREIGN PATENT DOCUMENTS

| | | | |
|---|---|---|---|
| GB | 2307439 A | | 5/1997 |
| GB | 2344555 A | * | 6/2000 |
| GB | 2344556 A | * | 6/2000 |
| WO | 95/07509 A1 | | 3/1995 |

OTHER PUBLICATIONS

Publication "Stereocol Selectively Colourable Stereolithography Resins User Manual", 8 pages(Undated).
Publication "Sterecol Part Building Guidelines for Stereolithography Machines", 4 pages(Undated).
Publication "Stereocol Part Building Guidelines for Stereolithography Machines", 4 pages(Undated).
Publication "Stereocol Product Description Y–C 9300R", 2 pages(Undated).
Publication "Stereocol Product Description A–C 9200R", 2 pages(Undated).
Publication "Stereocol Product Description H–C 9100R", 2 pages(Undated).

* cited by examiner

Primary Examiner—Leo B. Tentoni
(74) Attorney, Agent, or Firm—Ralph D'Alessandro; James E. Curry (57) ABSTRACT

A detoxification process for rendering three-dimensional objects formed by solid freeform fabrication techniques biocompatible for use in long-term dermal contact applications. The process nullifies cytotoxins normally present in objects formed by solid freeform fabrication techniques rendering such techniques as viable for the production of biocompatible devices such as stents, artery valve components, bone implant supports, pacemaker shells, surgical tools, and the like. In one embodiment, a custom hearing aid shell is produced by stereolithography from an acrylate photopolymer resin that was detoxified for long-term dermal contact application. The detoxification process makes three-dimensional objects created by solid freeform fabrication techniques available for products requiring biocompatibility.

50 Claims, 3 Drawing Sheets

FIG. 1

10 — SOLIDIFYING THE RESIN IN SUCCESSIVE LAYERS TO FORM A PRELIMINARY OBJECT CONTAINING CYTOTOXINS

12 — NULLIFYING THE CYTOTOXINS BY ENTRAPPING, EXTRACTING, AND/OR DECOMPOSING THE CYTOTOXINS

FIG. 2

10 — SOLIDIFYING THE RESIN IN SUCCESSIVE LAYERS TO FORM A PRELIMINARY OBJECT CONTAINING CYTOTOXINS

14 — NULLIFYING THE CYTOTOXINS BY SUBJECTING THE PRELIMINARY OBJECT TO ULTRASONIC STIMULATION IN A SOLVENT

FIG. 3

10 — SOLIDIFYING THE RESIN IN SUCCESSIVE LAYERS TO FORM A PRELIMINARY OBJECT CONTAINING CYTOTOXINS

16 — NULLIFYING THE CYTOTOXINS BY SUBJECTING THE PRELIMINARY OBJECT TO CHEMICAL EXTRACTION IN A SOXHLET EXTRACTOR

FIG. 4

10 — SOLIDIFYING THE RESIN IN SUCCESSIVE LAYERS TO FORM A PRELIMINARY OBJECT CONTAINING CYTOTOXINS

18 — NULLIFYING THE CYTOTOXINS BY SUBJECTING THE PRELIMINARY OBJECT TO STEAM CLEANING

FIG. 5

10 — SOLIDIFYING THE RESIN IN SUCCESSIVE LAYERS TO FORM A PRELIMINARY OBJECT CONTAINING CYTOTOXINS

20 — NULLIFYING THE CYTOTOXINS BY SUBJECTING THE PRELIMINARY OBJECT TO THERMAL HEAT

FIG. 6

10 — SOLIDIFYING THE RESIN IN SUCCESSIVE LAYERS TO FORM A PRELIMINARY OBJECT CONTAINING CYTOTOXINS

22 — NULLIFYING THE CYTOTOXINS BY SELECTING A BUILD STYLE WHERE THE BEAM WIDTH OF RADIATION OVERLAPS WHEN SOLIDIFYING THE RESIN IN THE LAYERS

FIG. 7

DETOXIFICATION OF SOLID FREEFORM FABRICATION MATERIALS

FIELD OF THE INVENTION

The invention relates in general to biocompatible medical structures, and in particular to a process to assure at least long-term dermal contact biocompatibility for three-dimensional objects formed from solid freeform fabrication techniques such as stereolithography. In one application the process is capable of producing a long-term dermal contact hearing aid shell structure custom made by stereolithography.

DESCRIPTION OF THE PRIOR ART

Conventional biocompatible and bioabsorbable materials have been proposed previously for long-term dermal contact applications, such as hearing aids. Generally, biocompatible materials exhibit non-toxic characteristics and do not adversely react with biological matter. Biocompatible testing is often done by placing a material in contact with living cells of an animal for extended periods of time in order to verify that no adverse reaction occurs. Bioabsorbable materials, on the other hand, while also exhibiting non-toxic characteristics, are capable of breaking down into small, non-toxic segments, which can be metabolized or eliminated from the body without harm. Both biocompatible and bioabsorbable materials lack the presence of significant amounts of cytotoxins, that is, substances or particulates that can produce a toxic effect to cells. Identifying specific cytotoxins in a specific material can prove problematic; however, cytotoxicity testing can readily be conducted to essentially determine whether or not a significant level of cytotoxins are present in a particular material. Until recently, the development of biocompatible materials for use in solid freeform fabrication techniques has been limited.

Generally, cytotoxins are constituent species of matter that, when in physical contact with cells, produce a toxic effect such as an allergic reaction. When present in sufficient quantity in an object, cytotoxins render the object unacceptable for biocompatible applications such as long-term dermal contact. Nearly all objects contain some quantity of cytotoxins, however the conventional wisdom to achieve biocompatibility is to start with a material that is inherently non-toxic, i.e. one that contains a de-minimus amount of cytotoxins. For example, several acrylate and methacrylate-type polymers have previously been suggested for a wide variety of applications involving some degree of biocompatibility because many such materials contain a de-minimus amount of cytotoxins. U.S. Pat. No. 5,763,503 to Cowperthwaite, et al. discloses a pourable methacrylate-capped urethane monomer/reactive diluent composition for use in pouring into a mold to form a hearing aid shell structure. Thus, it is generally taught that in order to produce a biocompatible object, one must start by selecting a material that is inherently non-toxic, i.e., one that contains a de-minimus amount of cytotoxins.

Recently, several new technologies have been developed for the rapid creation of models, prototypes, and parts for limited run manufacturing. These new technologies can generally be described as Solid Freeform Fabrication techniques, herein referred to as "SFF". Some SFF techniques include stereolithography, laminated object manufacturing, selective phase area deposition, multi-phase jet solidification, ballistic particle manufacturing, fused deposition modeling, particle deposition, laser sintering, and the like. Generally in SFF techniques, complex parts are produced from a modeling material in an additive fashion as opposed to traditional fabrication techniques, which are generally subtractive in nature. For example, in traditional fabrication techniques material is removed by machining operations or shaped in a die or mold to near net shape and then trimmed. In contrast, additive fabrication techniques incrementally add portions of a build material to targeted locations, layer by layer, in order to build a complex part. SFF technologies typically utilize a computer graphic representation of a part and a supply of a building material to fabricate the part in successive layers. A wide variety of building materials have been proposed in various SFF techniques; however, they are typically applied in the form of a powder, liquid, gas, paste, or gel. SFF technologies have many advantages over conventional manufacturing methods. For instance, SFF technologies dramatically shorten the time to develop prototype parts and can produce limited numbers of parts in rapid manufacturing processes. They also eliminate the need for complex tooling and machining associated with conventional manufacturing methods, including the need to create molds for custom applications. In addition, customized objects can be directly produced from computer graphic data. However, the use of SFF techniques to produce biocompatible objects has been limited.

It has been envisioned that prosthetic implants could be constructed directly from SFF techniques such as stereolithography. Such biocompatible applications are believed possible because polymerizable acrylates have previously been shown to be biocompatible, and it is assumed that objects formed from these materials in stereolithographic processes will therefore be biocompatible. For example, International Patent Application WO 95/07509 envisions the direct production of implants from a stereolithographic process, however, only the use of a stereolithographic object as an intermediate mold to create biocompatible prostheses is disclosed. This illustrates the recognized inability to directly produce biocompatible objects directly from a stereolithographic process utilizing materials believed to be biocompatible. Thus, there is a need to develop a process in which biocompatible objects can be produced directly by SFF techniques.

Most attempts to achieve biocompatible or bioabsorbable objects formed by SFF techniques have focused primarily on build material formulation. For example, a bioabsorbable stereolithographic resin is disclosed in U.S. Pat. No. 5,674,921 to Regula et al., which comprises a radiation curable, urethane acrylate and a photoinitator. However, it is significant to note that the samples disclosed were completely cured by flood curing with a UV light source, and not by a selectively applying a concentrated beam of UV energy as is done in stereolithography techniques. Furthermore, the formulations were not designed to be biocompatible, but rather bioabsorbable, that is, intended to break down into small non-toxic segments within a biological environment, instead of simply remaining stable and inert within the biological environment.

What appears to be under-appreciated in the prior art is that where the SFF build process produces parts that are typically toxic, additional post processing methods may be deployed to render them non-toxic. In addition, due to the inherently non-homogeneous nature of most SFF build processes, it is theorized that cytotoxins are typically retained within structures formed by such processes. This has been shown to be the case in stereolithography, and even when a part is homogeneously formed by stereolithography, it may still contain cytotoxins. These cytotoxins can undesirably react with biological matter in certain applications, particularly those requiring long-term dermal contact. It is the creation and/or retention of cytotoxins in these structures that presently prevents their use in biocompatible applications.

Generally, in most SFF techniques, structures are formed in a layer by layer manner by solidifying successive layers of a build material that are inherently non-homogeneous. For example, in stereolithography a tightly focused beam of energy, typically in the ultraviolet radiation band, is scanned across a layer of a liquid photopolymer resin to selectively solidify the resin to form a structure. In order to solidify each built up layer of the structure, the focused beam of energy must be driven back and forth across its surface. This build process, or hatching, often does not form a homogeneously cured layer because the focused energy only locally activates the photoinitiator in the resin. There is a wide variety of hatching techniques used in SFF techniques that can produce varying degrees of non-homogeneity within the structures produced. A representative example of the variety of build techniques available are disclosed in, for example, U.S. Pat. No. 5,855,718 to Nguyen et al. At one extreme is the investment casting build technique discussed in U.S. Pat. No. 5,482,659 to Sauerhoefer, in which a generally hollow structure is formed that requires the removal of a substantial amount of un-solidified liquid resin material. Generally the structures formed by most SFF processes such as stereolithography are not homogeneous. In stereolithography, after selective solidification, some locations of the polymers are highly cross-linked while in other locations they are partially cross-linked, or not cured at all. It is believed that uncured resin and/or partially cured resin are likely to contain toxic species.

The non-homogeneous aspect or non-uniform cure that results from some stereolithography hatching patterns is often desirable in many applications. For example, many hatching techniques are used to reduce cracking or distortion of the structure while it is being formed, even though cytotoxins are likely to be left behind in the structure. Some hatching techniques are used to increase build speed by reducing the amount of scanning of the laser, thereby leaving even a greater quantity of cytotoxins behind. In most of these non-biological applications, a simple UV postcure and wash is all that is needed to prepare the structure for use. Ultrasonic washing has been used, for example, with acetone as disclosed in U.S. Pat. No. 5,639,413 to Crivello, and with alcohol as disclosed in U.S. Pat. No. 5,482,650 to Sauerhoefer. Although such techniques are useful for washing and removing un-solidified resin material, they are not sufficient by themselves to detoxify structures for biocompatibility applications. Thus, objects cleansed by these techniques typically remain toxic even after cleaning.

It is believed the non-homogeneous cure that occurs when scanning a laser beam across a layer of polymerizable build material in a stereolithographic process becomes most problematic when trying to achieve biocompatibility for stereolithographic structures. It is believed the cytotoxins present in the formed object may be any combination of monomers, oligomers, photoinitiators, free radicals, polyols, photogenerated acid, stabilizers, and the like, that are originally present in the resin or generated during the cure of the resin. It is believed that portions of these cytotoxins are sufficiently entrapped such that they are not removed by simple washing operations and therefore remain in the structure. Thus, regardless if a fully cured resin formulation is believed to be biocompatible, the structures formed from the resin in a stereolithographic apparatus may still contain cytotoxins and as such may not be acceptable for use in biocompatible applications.

For example, a liquid acrylate photopolymer resin for use in stereolithography equipment sold by the name STERECOL Y-C 9300R has been proposed to produce low toxicity objects. The resin was designed for use in stereolithography equipment using a solid state or Argon laser to form three-dimensional objects. This resin was formerly manufactured and sold by Avecia Limited, of Manchester, England. Currently this resin is manufactured by Vantico, Inc. of Los Angeles, Calif., and is sold by 3D Systems, Inc. of Valencia, Calif. Preliminary objects made with this resin according to the recommended processing parameters provided by Avecia Limited failed to pass cytotoxicity tests for biocombatibility. It is theorized that cytotoxins were either established in or already present during the layer by layer forming process and their existence is believed most likely to be a result of insufficient cross-linking, incomplete cure, or continued reactivity after formation.

Thus, there is a need to nullify the cytotoxins within an SFF structure in order to render the structure biocompatible for at least long-term dermal contact. Thus, there is a need to develop a process beyond simple washing in order to assure such structures are detoxified regardless of the build technique or hatching style used during their formation. These and other difficulties of the prior art have been overcome according to the present invention.

BRIEF SUMMARY OF THE INVENTION

The present invention provides its benefits across a broad spectrum of medical devices, implants, and structures. While the description which follows hereinafter is meant to be representative of a number of such applications, it is not exhaustive. As will be understood, the basic methods and products taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to provide a process for detoxifying a three-dimensional object formed by a SFF technique by nullifying the cytotoxins that exist within the object after the layer by layer build process.

It is another aspect of the present invention to provide a process to assure at least long-term dermal contact biocompatibility for three-dimensional objects formed from SFF build materials such as liquid polymerizable resins used in stereolithography.

It is yet another aspect of the present invention to directly produce custom made biocompatible medical devices or structures by SFF techniques including stereolithography.

It is a feature of the present invention to detoxify a three-dimensional object formed by a SFF technique by entrapping at least some of the cytotoxins within the object.

It is another feature of the present invention to detoxify a three-dimensional object formed by a SFF technique by extracting at least some of the cytotoxins out of the object.

It is yet another feature of the present invention to detoxify a three-dimensional object formed by a SFF technique by decomposing at least some of the cytotoxins into a non-toxic state within the object.

It is yet another feature of the present invention to detoxify a three-dimensional object formed by a SFF technique by advancing the state of cure of the object.

It is yet another feature of the present invention to incorporate a simple and repeatable post-processing step to detoxify three-dimensional objects formed from SFF build materials including liquid polymerizable resins used in stereolithography.

It is still yet another feature of the present invention to develop a SFF build style that nullifies some of the cytotoxins within the three-dimensional object by advancing the state of cure of the object during object formation.

It is an advantage of the present invention to directly create biocompatible medical structures without first creating a mold in which to form the structure.

It is another advantage of the present invention to directly produce biocompatible medical structures from data descriptive of the structures that can be generated by computer models and used in any SFF technique.

It is yet another advantage of the present invention detoxification process to make available the benefits of solid freeform fabrication techniques to applications requiring some level of biocompatibility.

These and other aspects, features, and advantages are achieved/attained in the method and apparatus of the present invention.

BRIEF DESCRIPTION OF THE DRAWINGS

The aspects, features, and advantages of the present invention will become apparent upon consideration of the following detailed disclosure of the invention, especially when it is taken in conjunction with the accompanying drawings wherein.

To facilitate understanding, identical reference numerals have been used, where possible, to designate identical elements that are common in the figures.

DETAILED DESCRIPTION OF THE PREFERRED EMBODIMENTS

While the present invention is applicable to all SFF techniques and objects made therefrom, the invention will be described with respect to stereolithography utilizing polymerizable resins as the build material. However it is to be appreciated that the present invention can be implemented with any SFF technique utilizing a wide variety of build materials. For example, the build material can be a photocurable or sinterable material applied in the form of a powder, paste, liquid, or gel. In addition, the build material may be a composite mixture of components, such as a mixture of photocurable liquid resin and powder metals, if desired. Also, the present invention is applicable to SFF techniques such as MicroStereolithography, which can produce the extremely small yet intricate objects in demand as a result of recent advances in medical implant procedures.

Figure 1:
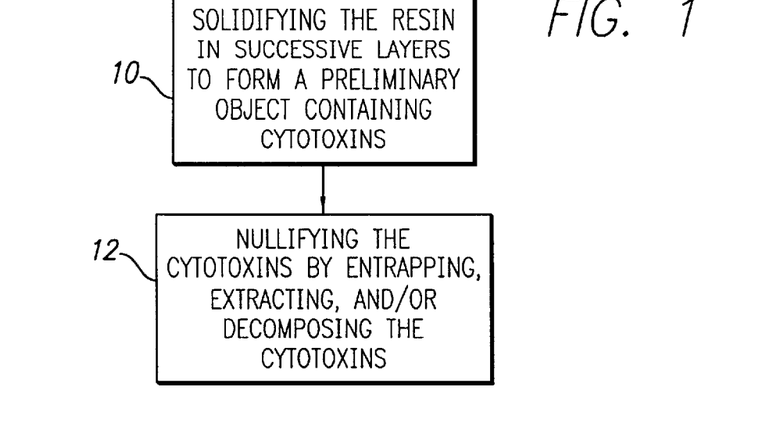
FIG. 1 is a flow chart of the present invention detoxification process.

Referring particularly to FIG. 1, there is illustrated generally a flow chart of the present invention detoxification process. The first step, identified by the numeral 10, involves producing a preliminary object by any SFF technique such as stereolithography. In particular, the step involves solidifying a polymerizable resin in successive layers to form a preliminary object that contains cytotoxins. Preferably the resin is a photocurable acrylate resin which is solidified by application of laser energy; however, the resin could also be a liquid polymer selected from the group consisting of an acrylate, an epoxy, or an epoxy/acrylate blend, if desired. For example, a preliminary object can be made with a SLA® 3500 system commercially available by 3D Systems, Inc. of Valencia, Calif. using a liquid acrylate photopolymer resin such as STERECOL Y-C 9300R made by Vantico, Inc. and sold by 3D Systems. An alternative resin that has been proved successful could be used, if desired, such as the epoxy-acrylate resin sold under the name SL 7540 by 3D Systems, Inc. The material may also be a photopolymer jetted from a three dimensional printer such as the Objet Quadra three-dimensional printer offered for sale by Object Geometries Ltd., of Rehovot, Israel, if desired. However it is preferred to utilize acrylate resins such as STERECOL Y-C 9300R and not epoxy-acrylate resins because epoxy blended materials are believed to be more cytotoxic than acrylate materials and because they generally react (cure) more slowly. It is theorized that cytotoxins are established in the structure during formation of the preliminary object, which are likely to comprise any combination of monomers, oligomers, photoinitiators, free radicals, polyols, photogenerated acid, stabilizers, and the like, within the solidified resin.

The second step, identified by the numeral 12 in FIG. 1, involves nullifying the cytotoxins by entrapping them, extracting them, decomposing them, and/or transforming them into a non-toxic state. Cytotoxins may be nullified by entrapment in the object once formed such that they are unable to make contact with biological material. Cytotoxins may be nullified by extracting them from the objects once formed by detoxification processing. Cytotoxins may also be nullified be decomposing the cytotoxins, by breaking them down into inert matter by detoxification processing. It is also believed that cytotoxins may be transformed into a non-toxic state when the state of cure is advanced in an object. For example, two free radicals, which may be cytotoxic, may combine together during the termination steps of the chain reaction into a state that is no longer toxic. Other chemical polymer transformations may also occur that nullify the cytotoxins by transforming them into a non-toxic state. Generally, it is believed that most any detoxification processing will nullify cytotoxins by any combination of entrapment, extraction, decomposition, or transformation of the cytotoxins.

Figure 2:
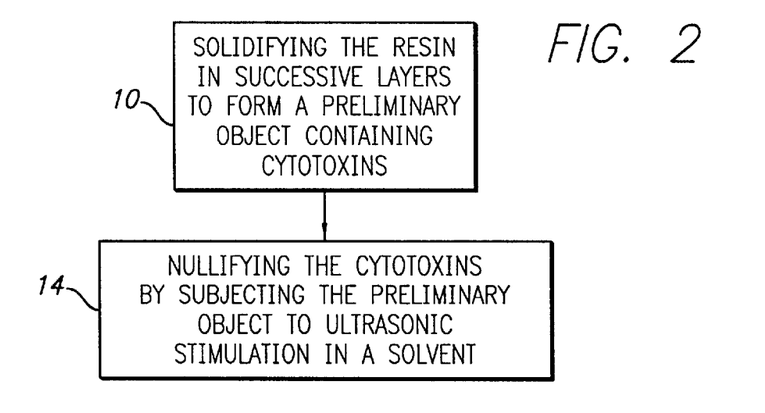
FIG. 2 is a flow chart of an embodiment of the detoxification process of the present invention using ultrasonic stimulation.

In the embodiment shown in FIG. 2, the step of nullifying the cytotoxins is shown by the numeral 14 wherein the preliminary object is subjected to ultrasonic stimulation in a medium, such as isopropyl alcohol. Tests were conducted where the preliminary objects were subjected to ultrasonic stimulation in isopropyl alcohol for about two hours in which the objects passed cytotoxicity tests. It is theorized that ultrasonic stimulation in a medium such as a solvent is a penetrating method that extracts some of the cytotoxins, decomposes some of the cytotoxins, and entraps some of the cytotoxins by advancing the state of cure of the object.

Figure 3:
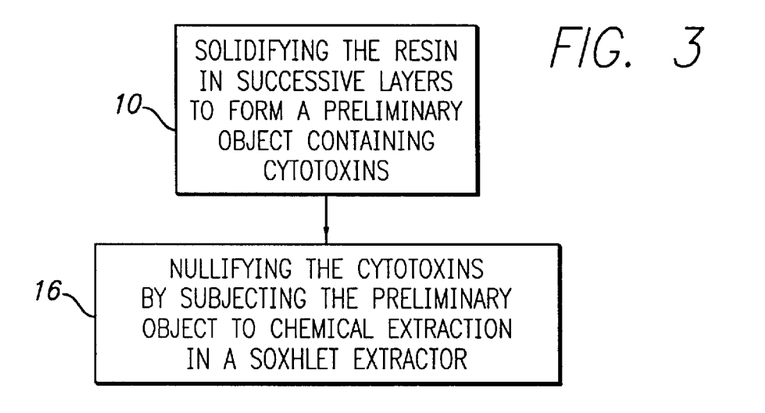
FIG. 3 is a flow chart of another embodiment of the detoxification process of the present invention using chemical extraction.

An alternative embodiment is shown in FIG. 3, wherein the second step of nullifying the cytotoxins is identified by the numeral 16. In this embodiment the preliminary object is subjected to chemical extraction in a soxhlet extractor, although other extraction methods could be used. Preferably the medium used for chemical extraction in the soxhlet extractor is isopropyl alcohol, although other solvents could be used as the medium, if desired. In some of the tests conducted, it took about two hours of continuous extraction in the soxhlet extractor to produce objects that passed cytotoxicity tests. It is theorized that when using the soxhlet extractor, some of the cytotoxins are removed from the object, some of the cytotoxins are decomposed within the object, and some of the cytotoxins are entrapped within the object as the state of cure of the object is advanced. Preliminary tests using this process resulted in biocompatible three-dimensional objects formed by stereolithography having essentially no cytotoxins. Further, the objects passed irritation tests which demonstrated they could be used for long-term dermal contact applications.

Figure 4:
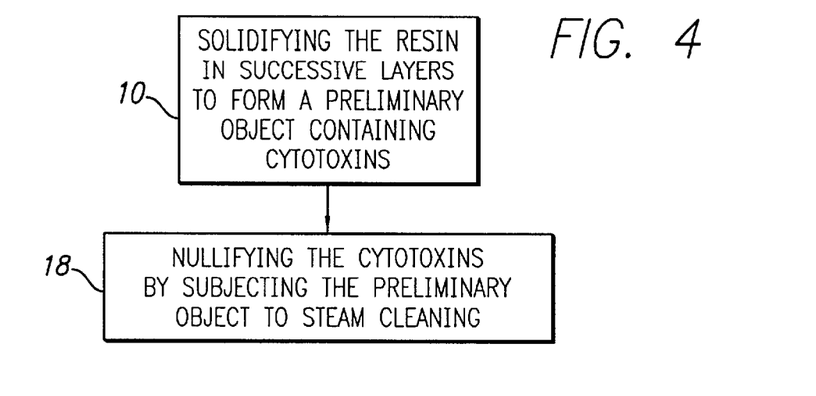
FIG. 4 is a flow chart of another embodiment of the detoxification process of the present invention using vapor treatment with a medium.

Another alternative embodiment is shown in FIG. 4, wherein the second step of nullifying the cytotoxins is identified by the numeral 18. In this step the preliminary object is subjected to vapor treatment in a suitable medium. The medium could be water in the form of steam, or a solvent. Some suitable solvents are isopropyl alcohol or any other primary or secondary alcohol. Acetone may also be used, if desired. As used herein, vapor treatment in a medium means that the medium is at or above its boiling point for a given pressure when applied to an object to nullify cytotoxins. The given pressure may be above or below atmospheric pressure, as desired. In one embodiment, the objects were steam treated in an autoclave between about 121° to about 124° C. at about 18 psig for about 30 minutes. Other temperatures and pressures may be used, if desired, as long as the medium is at least partially in a vapor state, such as when water is steam.

It is theorized that by vapor treatment, some of the cytotoxins are entrapped within the object due to the advancing of the state of cure of the object, and that some of the cytotoxins are decomposed to a non-toxic state within the object. Of the embodiments shown, vapor treatment in an autoclave proved to be the fastest process for detoxifying three-dimensional parts produced by stereolithography. In addition, preliminary tests using this process on three-dimensional objects formed by stereolithography produced objects having essentially no cytotoxins. Further, the objects passed irritation tests demonstrating they can be used in long-term dermal contact applications.

Figure 5:
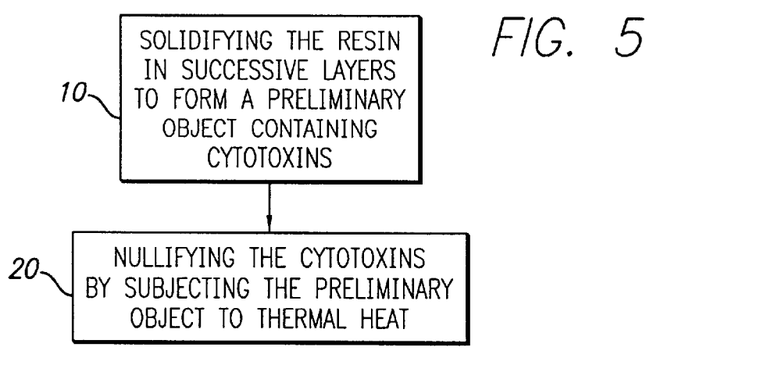
FIG. 5 is a flow chart of another embodiment of the detoxification process of the present invention using thermal heat.

Another alternative embodiment is shown in FIG. 5, wherein the second step of nullifying the cytotoxins is identified by the numeral 20. In this step the preliminary object is subjected to heat. Tests were conducted where a preliminary object was placed in an oven between about 120° to about 160° C. for about a twenty-four hour period at atmospheric pressure. It is theorized that heating advances the state of the cure of the object to entrap some of the cytotoxins and decomposes some of the cytotoxins into a non-toxic state. The objects tested passed cytotoxicity tests; however, heating is not a preferred process due to the length of time needed to detoxify the objects.

Figure 6:
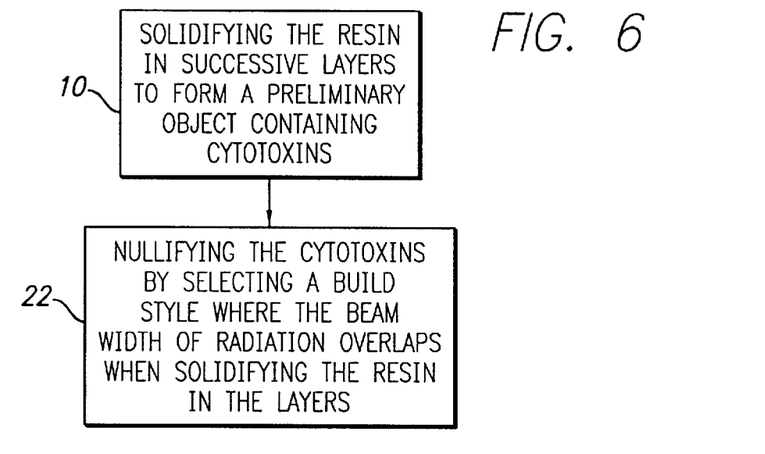
FIG. 6 is a flow chart of another embodiment of the detoxification process of the present invention using an overlapping build style.

Another alternative embodiment is shown in FIG. 6, wherein the cytotoxins are nullified by selecting a build style utilizing a desired beam shape where each hatching pass is less than one beam width from the previous pass such that the beam width of radiation overlaps when solidifying the resin in the layers. Samples were produced using such a build style on the SLA® 3500 system commercially available from 3D Systems, Inc. The samples generally passed cytotoxicity tests, however, it is uncertain whether it is acceptable to mass produce such objects as the build style selected tends to operate the stereolithography apparatus at a very slow rate. In this embodiment generally small three-dimensional objects are preferably made; however, it may still be advantageous to apply further detoxification processing. Thus, even though favorable test samples were produced, it is preferred to further detoxify such articles by one of the other processes to assure biocombatibility.

Cytotoxicity tests were conducted on three-dimensional objects according to the ISO 10993-5 guidelines for cytotoxicity. The cytotoxicity tests followed the Agarose overlay method utilizing L929 mouse fibroblast cells to measure the toxic level of the samples. The results of the tests were provided on a 5 scale ranking system in which a score of 0, 1, 2, 3, and 4 can be obtained. A score of 0 indicates no toxic reaction was observed and a score of 4 indicates a strong toxic reaction was observed. A score of 0, 1, or 2, are considered non-toxic scores, a score of 3 is considered weakly to moderately toxic, and a score of 4 is considered strongly toxic. Scores of 0, 1, or 2 are considered passing scores, that is, the samples may be generally acceptable for long-term dermal contact applications and are therefor biocompatible. Additional testing was done for irritation for some of the samples produced according to the ISO 10993-10 guidelines for irritation and sensitization. Under these tests, the samples were placed in dermal contact with a quantity of laboratory rabbits for various periods of time to develop a Primary Irritation Index. An outside laboratory specializing in biocompatible testing conducted the cytotoxin and irritation tests.

Figure 7:
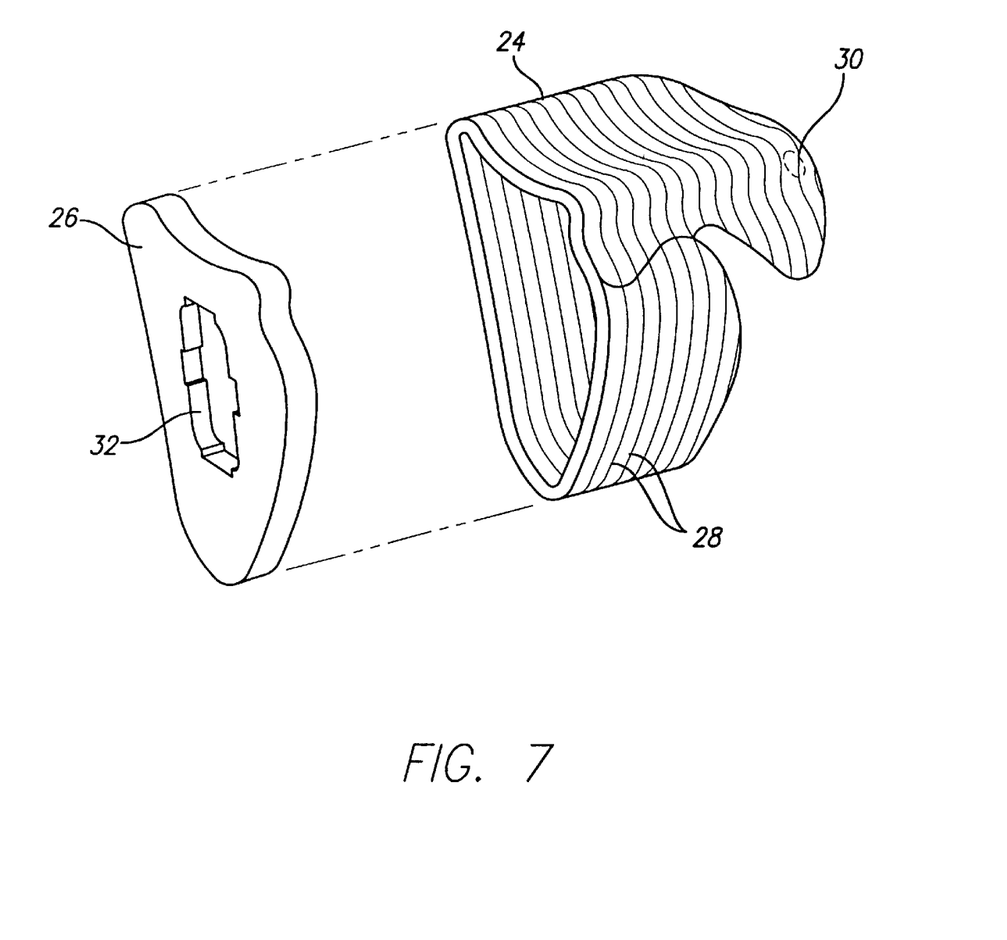
FIG. 7 is an isometric view of a hearing aid shell formed by the present invention detoxification process.

Referring now to FIG. 7, a biocompatible hearing aid shell identified by the numeral 24 is shown that was produced in accordance with the process described in FIG. 1. The hearing aid shell 24 was selectively formed by a stereolithographic process in a layer by layer fashion, some of the layers identified by numeral 28. The shell was formed from the acrylate photopolymer resin sold under the name STEREOCOL Y-C 9300R as discussed below. Initially, the shell 24 was a preliminary object that was subjected to standard post-forming cleaning operations used in stereolithography. The object was then subjected to ultrasonic treatment in isopropyl alcohol for about 2 hours in order to nullify the cytotoxins, although any one of the detoxification processes discussed herein could have been used. The shell was then bonded to a hearing aid adapter plate 26 with a biocompatible adhesive. The adapter plate 26 has a mounting flange 32 for securing the electronics of a hearing aid device and/or battery (not shown) within the shell 24. The shell was then coated with an UV curable lacquer, as is common practice for hearing aid shells. The hearing aid shell formed by stereolithography and detoxified by the process of the present invention has many advantages over existing hearing aid manufacturing processes. For example, as discussed in U.S. Pat. No. 6,022,311 to Juneau et al., no longer is it needed to form a one time custom mold from a dental acrylic for a specific hearing aid user. Instead, the advantages of directly forming intricate shapes from computer models by the stereolithographic process can be used to create hearing aid shells as a result of the present invention detoxification process. Such hearing aid shells must be acceptable for long-term dermal contact and the detoxification process of the present invention assures objects produced by stereolithography are acceptable for such applications. Although long-term dermal contact hearing aid shells have been produced, it is envisioned that other suitable biocompatible three-dimensional objects can be made according to the present invention. For example, a wide variety of products could be formed and detoxified according to the present invention, such as stents, artery valve components, bone implant supports, pacemaker shells, surgical tools, prosthetic devices, and the like.

The following examples are provided to illustrate particular embodiments which fall within the scope of the claimed invention. It will be readily appreciated that numerous additional embodiments can be envisioned that would readily fall within the scope of the appended claims.

Preliminary objects were made with a photocurable resin sold under the name STERECOL™ Y-C 9300R that was used in a SLA® 3500 System commercially available from 3D Systems, Inc. These preliminary objects, or test samples, were approximately 10 mm ×10 mm and 2.4 mm thick. The samples were produced by selecting a Star-Weave™ build style as recommended in procedures in the Users Manual provided by Zeneca Specialties in conjunction with Avecia Limited, a previous supplier of the resin. The following resin parameters were used:

| $Ec = 8.4$ mJ/cm$^2$ | $Dp = 9.4$ mils |
|---|---|

The overcure value for hatchings was set to 0.02 mm, the hatch space was set at 0.3 mm, the overcure value for borders was set to 0.1 mm, and the overcure value for supports was set to 0.35 mm. Although the Users Manual recommended an ideal layer thickness of 0.25 mm, the preliminary objects were built with a build layer thickness set at 0.075 mm because higher resolution was needed in order to manufacture hearing aid shells. However, it is believed that the deviation from the ideal build layer thickness would have no measurable impact on the toxicity levels of the preliminary objects.

COMPARATIVE EXAMPLE

Some of the preliminary objects produced as discussed above were post-processed to establish a comparative sample. They were first post-processed by rinsing in tech grade isopropyl alcohol for 1 hour. The sample parts were then UV postcured in a post curing apparatus sold under the name PCA™ 3500 using high UV content fluorescent lamps. The PCA™ 3500 apparatus is commercially available from 3D Systems, Inc. Three test samples were evaluated for cytotoxicity in accordance with ISO 10993-5 and were found to be strongly toxic, scoring a 4 on the scale of 0 through 4.

Several additional confirmatory tests were conducted in order to assure the cytotoxicity measured in the test samples was not due to the cleaning solvent used, nor due to insufficient UV cure. Test samples were again produced and wiped clean with paper towels and then UV postcured. This test is believed to eliminate isopropyl alcohol as a possible contaminant. Another study was conducted where pharmaceutical grade isopropyl alcohol was used to wash the test samples, and high intensity UV mercury lamps were used to UV postcure the samples. This was done in order to reduce the possibility that an insufficient postcure could be present that might effect the degree of cytotoxicity measured in the tests. In all cases the test samples failed to pass the cytotoxicity tests. In all cases the preliminary objects were found to be strongly toxic with a score of 4 in accordance with the ISO 10993-5 standard for cytotoxicity. Unless otherwise mentioned, the preliminary objects made as described above were used in developing the detoxification processes in Examples 1 through 4. These preliminary objects therefore served as comparative baseline objects for determining the detoxification capabilities of the various processes tested.

Example 1

Ultrasonics

A method for producing non-cytotoxic parts from a photocured acrylate or epoxy/acrylate test article by employing an ultrasonic bath filled with isopropyl alcohol was developed. It was discovered that the preliminary objects could essentially be rendered non-cytotoxic by ultrasonic cleaning in a bath of solvent such as isopropyl alcohol. Preliminary objects were built on a 3D Systems' SLA® 3500 system as described previously. The samples were then placed in a VWR Aquasonic75T ultrasonic cleaner available commercially from VWR Scientific Products of West Chester, Pa., and filled with isopropyl alcohol. The samples were subjected to ultrasonic stimulation for about 0.5 hours within the isopropyl alcohol. The samples were then transferred to a smaller ultrasonic unit, namely, a L & R Model PC3 ultrasonic cleaner available commercially from Edmond Scientific of Tonawanda, N.Y. The samples were then further subjected to ultrasonic stimulation in isopropyl alcohol for an additional time period of about 1.5 hours. Following the treatment by ultrasonics, the samples were removed and wiped dry with paper towels. The samples were then UV postcured for about 90 minutes in the post curing apparatus discussed previously. These treated and postcured samples were then measured for cytotoxicity in accordance with ISO 10993-5. The samples received a score of 0 for cytotoxicity, indicating that they were nontoxic. This confirmed that application of ultrasonic stimulation in an isopropyl alcohol medium was capable of rendering previously cytotoxic acrylate based photopolymerized samples non-cytotoxic. Further, primary skin irritation tests according to ISO 10993-10 were conducted on the samples that had been processed in an ultrasonic bath of isopropyl alcohol for a total of about 2 hours. These tests indicated negligible irritation on the shaved skin of rabbit test subjects exposed for 24, 48, or 72 hours to the samples.

Shorter periods of ultrasonic stimulation were also tested. In a second ultrasonic experiment preliminary test samples were placed in a bath of isopropyl alcohol in the VWR Aquasonic75T ultrasonic unit and exposed to ultrasonic stimulation for about 60 minutes prior to being UV postcured. These samples were then wiped dry and UV postcured for about 90 minutes as discussed above. These samples scored a 3 according to the ISO 10993-5 standard for cytotoxicity, which is considered moderately toxic by the standard, demonstrating they are generally not acceptable for long-term dermal contact applications. In a third ultrasonic experiment preliminary test samples were subjected to ultrasonic stimulation for about 30 minutes prior to being UV postcured, and these samples also scored a 3 according to the ISO 10993-5 standard for cytotoxicity. Thus, it was determined that ultrasonic stimulation must be applied for at least about 30 minutes when using isopropyl alcohol as the medium, and preferably for up to about 2 hours, in order to achieve biocompatibility for long-term dermal contact applications. However, ultrasonic stimulation times may vary depending on the medium being used, and/or on the size of the object being processed.

The ultrasonic tests conducted indicate that in order to get the maximum benefit from ultrasonic detoxification, the samples must be exposed to ultrasonic stimulation in isopropyl alcohol for at least about 1 hour and preferably for at least about 2 hours. However, shorter periods of stimulation may be possible depending on the type of medium used and/or size of the object being processed.

Example 2

Chemical Extraction

A chemical extraction process was also developed to detoxify some of the preliminary test samples produced as discussed above. The preliminary test samples were placed in a 33 ×80 mm cellulose thimble within a 45/50 Kimax soxhlet extractor/allihn condenser apparatus commercially available from Fisher Scientific International, Inc., of Hampton, N.H. The extractor was attached to a 500 mL round bottom flask filled with isopropyl alcohol as the extraction medium. The isopropyl alcohol was brought to a boil by heating the alcohol over a heated oil bath. The water-jacketed allihn condenser located above the soxhlet extractor condensed the isopropyl alcohol. The condensed alcohol was collected in the receiving area of the extractor around the test samples and eventually drained from the receiving area through the siphon on the side of the soxhlet extractor. As the isopropyl alcohol was drained from the extractor, freshly distilled isopropyl alcohol was continuously collected over the test samples. The test samples were thus continuously rinsed in the soxhlet by distilled isopropyl alcohol for about 2 hours, upon which time the test samples were removed. The samples were then UV postcured for about 90 minutes and tested for cytotoxicity. The samples scored a 0 according to the ISO 10993-5 standard for cytotoxicity. Thus, initially cytotoxic preliminary test samples were rendered nontoxic by chemical extraction with isopropyl alcohol in a soxhlet extractor. Extraction times greater than two hours were found to produce no additional gains in the removal of cytotoxins. However an extraction time of about 30 minutes resulted in an object scoring a 2 according to the ISO 10993-5 standard for cytotoxicity, generally indicating the lower threshold extraction time necessary to produce objects acceptable for long-term dermal contact applications. These tests indicate that when utilizing isopropyl alcohol as the extraction medium, it is preferred to operate the extractor between about 30 minutes to about 2 hours in order to achieve the desired biocompatibility levels necessary for long-term dermal contact applications.

While isopropyl alcohol was used as the extraction medium, it is likely that many other extraction mediums could be used effectively with this technique to render photocured materials nontoxic. For instance, other primary and secondary alcohols could be used. Similarly, other solvents such as acetone could be used, if desired.

In an alternative extraction test it was demonstrated that this technique could be used to render articles produced from photocurable epoxy/acrylate blends nontoxic. Preliminary objects were produced on an SLA® 3500 system utilizing a photocurable epoxy/acrylate resin sold under the name SL 7540 by 3D Systems, Inc. and manufactured by Vantico, Inc. The preliminary objects were made by utilizing the default parameters commercially available from software package 3D LightYear™ 1.1 provided by 3D Systems, Inc., for the SLA® 3500 system and the SL 7540 resin combination. The "Exact-X" build style was selected along with a layer thickness of 0.0040 inches, and the preliminary objects were built to a size of about 10 mm×10 mm×2.4 mm. Some of the preliminary objects were then tested for cytotoxicity according to the ISO 10993-5 standard and were found to score a 4, indicating they are severely toxic. Some of these preliminary objects were then subjected to chemical extraction in a soxhlet extractor in isopropyl alcohol for about 17 hours, and then postcured in a PCA™ 3500 apparatus for about 90 minutes, as discussed above. These samples were then tested for cytotoxicity according to the ISO 10993-5 standard, and produced a passing score of 2. Thus, severely toxic preliminary test samples made from an epoxy/acrylate blend resin were rendered nontoxic by chemical extraction in isopropyl alcohol in a soxhlet extractor.

Example 3

Autoclaving

Preliminary objects were produced as described previously with STEREOCOL™ Y-C 9300R resin. These samples were then UV postcured for 90 minutes in a PCA™ 3500 apparatus as described previously. They were then shipped to an independent testing laboratory and subjected to vapor treatment in an Amsco Model 3000SL autoclave. This autoclave and others are available, for instance, from Lancer Medical Services, Inc., of Azusa, Calif. The autoclave was operated in gravity mode between about 121° and about 124° C. for about thirty minutes at a pressure of about 18 psig. The autoclave treated test samples were then tested for cytotoxicity and found to yield a score of 0, thus the test samples were rendered nontoxic. This detoxification process took the shortest time to complete and also produced the lowest cytotoxicity results. The operation temperature of the autoclave could be increased or decreased if desired. In addition, the time duration of the autoclave could be increased or decreased, if desired. Further, primary skin irritation tests according to ISO 10993-10 indicated negligible irritation to the shaved skin of rabbit test subjects exposed for 24, 48, or 72 hours to these samples. Because the results of the thirty minute vapor treatment in the autoclave produced objects having no observable toxicity, significantly shorter vapor treatment periods are believed possible, such as about five minutes or less, which may also achieve acceptable results for long-term dermal contact applications. Although a minimum vapor treatment period was not determined, it is believed such a minimum period would be dependent on a variety of factors such as the vapor medium used, the temperature of the vapor medium, the pressure of the vapor medium, and the size of the object being treated.

Autoclave cycles are typically used for sterilization, such as removing bacterial contaminants, and the like, from medical devices. However, in this application the steam treatment in the autoclave is believed to induce a chemical change in the acrylate based photopolymer material of the test samples. It is also theorized that the steam decomposes certain cytotoxic species within the photocured test samples, and further that the steam advances the state of cure (or polymerization) of the test articles thereby entrapping residual toxins within the article.

Example 4

Heating

Again, preliminary objects or test samples were initially built on a SLA®3500 system as described previously with the STEREOCOL™ Y-C 9300R resin. These samples were then washed in isopropyl alcohol for about 1 hour, postcured under mercury arc lamps for about 1 hour, and then postcured for about 90 minutes under UV fluorescent lamps in a PCA™ 3500 ultraviolet radiation curing apparatus. These test samples were then subjected to an extended period of heat generally intended to decompose or extract cytotoxins from the photocured arcylate test samples. The thermal treatment is believed to both advance the state of cure (or polymerization) of the photocured arcylate, and to decompose certain potentially cytotoxic species within the photocured arcylate. Such decomposed cytotoxic species are believed to include residual photoinitiators, and/or short chained arcylate monomers and oligomers.

The test samples were subjected to about a twenty-Ibur hour period in an oven at about 160° C. and at atmospheric pressure. Additional test samples where heated to about 120° C. at atmospheric pressure and held there for about a twenty-four hour period. In both heating cycles tested, the samples scored a 1 according to the ISO 10993-5 standard for cytotoxicity. This is acceptable for most dermal contact applications. Shorter time cycles and lower temperatures can also be used to lessen the cytotoxicity of photocured acrylate samples, if desired. In one study, test samples were heated to about 100° C. for about 2 hours. In this case, the cytotoxicity was reduced from a level 4, to a level 3 indicating the samples are still weakly to moderately toxic. While this level of cytotoxicity (level 3) is not sufficient for most medical applications, it does indicate that more gentle processing methods should be possible that would still render the test articles nontoxic according to the ISO 10993-5 standard. Thus, when using the heating process, the objects should at least be heated to about about 100° C. for at least about 2 hours, and preferably should be heated for longer periods of time and/or at higher temperatures. However, heating is less preferred than the other detoxification processes discussed herein due to the length of time needed to complete the heating process.

Example 5

Overlapping Hatch Build Style

Test samples were built on an SLA® 3500 system with the STEREOCOL™ Y-C 9300R resin as discussed above, using an overlapping hatch build style with a beam of desired shape. Generally, this is a build style in which the hatch lines drawn by the laser are close enough together such that the cure width of adjacent scan lines overlap (i.e. they are spaced at most one cured line width apart). In this particular example the hatch lines were spaced at 0.004"(0.1 mm). Hatch overcure was set to 0.002"(0.05 mm), border overcure was set to 0.006"(0.15 mm), and the layer thickness was 0.003"(0.075 mm). Up facing fill cure depth was set to 0.01"(0.25 mm), down facing fill cure depths were set to 0.0132"(0.33 mm). The desired beam shape is circular having a beam width of 0.010", which is the default beam width for the SLA®3500 system. Other beam shapes could be used, if desired, such as an elliptical shape. No retraction was used; however, alternate sequencing and staggered hatch were used. All other parameters were set in the commercially available software package 3D LightYear™ 1.1 provided by 3D Systems, Inc., for use with the SLA® 3500 system. Test samples were built using the parameters discussed above, then washed in isopropyl alcohol for about 1 hour, and then UV postcured under fluorescent lamps for about 4 hours.

The samples were then tested for cytotoxicity and received a score of 1, indicating that the samples are nontoxic according to the ISO standard. It was thus demonstrated that the build style used to produce the samples had a pronounced effect on the potential for such samples to be toxic. It is believed that the use of tighter hatch spacing can result in sufficient cure such that toxic species are reacted, decomposed, or otherwise trapped within the test article rendering it nontoxic. However, due to the wide variety of build styles and parameters available for use, and considering the nearly infinite geometric possibilities for biocompatible objects, it is still preferable to post process objects formed by stereolithography or other SFF techniques with a proven detoxification process to assure biocompatibility. In addition, it should be noted that the overlapping build style has the disadvantage of being a slow build style which may not be practical for some applications.

What has been described are preferred embodiments in which modifications and changes may be made without departing from the spirit and scope of the accompanying claims.

What is claimed is:

1. A method of forming and detoxifying a three-dimensional object formed by solid freeform fabrication, the object being detoxified for at least long-term dermal contact biocompatibility, the method comprising:

forming a preliminary object in successive layers with a build material in a layerwise fashion, the preliminary object containing cytotoxins;

nullifying the cytotoxins in the preliminary object to establish a biocompatible three-dimensional object.

2. The method of claim 1 wherein the step of nullifying the cytotoxins is accomplished individually or in any combination of the following steps:

entrapping at least some of the cytotoxins within the three-dimensional object by advancing a state of cure of the preliminary object;

extracting at least some of the cytotoxins from the preliminary object by immersing the preliminary object in a medium;

decomposing at least some of the cytotoxins into a non-toxic state within the three-dimensional object by subjecting the preliminary object to thermal energy; or transforming at least some of the cytotoxins into a non-toxic state within the three-dimensional object by advancing the state of cure of the object.

3. The method of claim 1 wherein the build material is photocurable or sinterable and is applied in successive layers in the form of a powder, paste, liquid, or gel.

4. The method of claim 3 wherein the build material is a photocurable material selected from the group consisting of an acrylate, an epoxy, or an epoxy/acrylate blend.

5. The method of claim 1 wherein the step of nullifying the cytotoxins is accomplished by immersing the preliminary object in a medium and subjecting the preliminary object to ultrasonic stimulation.

6. The method of claim 5 wherein the medium is isopropyl alcohol.

7. The method of claim 6 wherein the ultrasonic stimulation is applied for more than about 30 minutes.

8. The method of claim 1 wherein the step of nullifying the cytotoxins is accomplished by subjecting the preliminary object to chemical extraction in a medium.

9. The method of claim 8 wherein the medium is isopropyl alcohol.

10. The method of claim 9 wherein the chemical extraction is performed in a soxhlet extractor for more than about 30 minutes.

11. The method of claim 1 wherein the step of nullifying the cytotoxins is accomplished by subjecting the preliminary object to vapor treatment in a medium.

12. The method of claim 11 wherein the vapor treatment is applied for at least about 5 minutes.

13. The method of claim 12 wherein the medium is steam.

14. The method of claim 13 wherein the temperature of the steam is between about 121° C. and about 124° C. and applied for about 30 minutes.

15. The method of claim 1 wherein the step of nullifying the cytotoxins is accomplished by bringing the temperature of the preliminary object to at least about 100 degrees Celsius.

16. The method of claim 15 wherein the temperature of the preliminary object is maintained at least about 100 degrees Celsius for a period of at least about 2 hours.

17. The method of claim 1 wherein the build material is solidified in each successive layer by selectively applying radiation in a beam of desired shape in each successive layer along a plurality of scan lines, the cytotoxins being nullified by scanning the beam in an overlapping fashion along adjacent scan lines in each layer.

18. A method of forming and detoxifying a three-dimensional object for long-term dermal contact biocompatibility, the method comprising:
   forming a preliminary object in successive layers with a polymerizable build material in a layerwise fashion, the preliminary object containing cytotoxins;
   nullifying the cytotoxins in the preliminary object to establish a biocompatible three-dimensional object.

19. The method of claim 18 wherein the polymerizable build material is a photopolymer.

20. The method of claim 19 wherein the step of nullifying the cytotoxins is accomplished individually or in any combination of the following steps:
   entrapping at least some of the cytotoxins within the three-dimensional object by advancing a state of cure of the preliminary object;
   extracting at least some of the cytotoxins from the preliminary object by immersing the preliminary object in a medium;
   decomposing at least some of the cytotoxins into a non-toxic state within the three-dimensional object by subjecting the preliminary object to thermal energy; or
   transforming at least some of the cytotoxins into a non-toxic state within the three-dimensional object by advancing the state of cure of the object.

21. The method of claim 20 wherein the build material is a photocurable material selected from the group consisting of an acrylate, an epoxy, or an epoxy/acrylate blend.

22. The method of claim 18 wherein the step of nullifying the cytotoxins is accomplished by immersing the preliminary object in a medium and subjecting the preliminary object to ultrasonic stimulation.

23. The method of claim 22 wherein the medium is isopropyl alcohol.

24. The method of claim 23 wherein the ultrasonic stimulation is applied for more than about 30 minutes.

25. The method of claim 18 wherein the step of nullifying the cytotoxins is accomplished by subjecting the preliminary object to chemical extraction in a medium.

26. The method of claim 25 wherein the medium is isopropyl alcohol.

27. The method of claim 26 wherein the chemical extraction is performed in a soxhlet extractor for more than about 30 minutes.

28. The method of claim 18 wherein the step of nullifying the cytotoxins is accomplished by subjecting the preliminary object to vapor treatment in a medium.

29. The method of claim 28 wherein the vapor treatment is applied for at least about 5 minutes.

30. The method of claim 29 wherein the medium is steam.

31. The method of claim 30 wherein the temperature of the steam is between about 121° C. and about 124° C. and applied for about 30 minutes.

32. The method of claim 18 wherein the step of nullifying the cytotoxins is accomplished by bringing the temperature of the preliminary object to at least about 100 degrees Celsius.

33. The method of claim 32 wherein the temperature of the preliminary object is maintained at least about 100 degrees Celsius for a period of at least about 2 hours.

34. The method of claim 33 wherein the build material is solidified in each successive layer by selectively applying radiation in a beam of desired shape in each successive layer along a plurality of scan lines, the cytotoxins being nullified by scanning the beam in an overlapping fashion along adjacent scan lines in each layer.

35. A method of forming and detoxifying a three-dimensional object formed by solid freeform fabrication, the object being detoxified for at least long-term dermal contact biocompatibility, the method comprising:
   forming a preliminary object in successive layers with a build material in a layerwise fashion, the preliminary object containing cytotoxins;
   subjecting the preliminary object to ultrasonic stimulation in a medium for a sufficient period of time so as to nullify the cytotoxins in the preliminary object and thereby establish a biocompatible three-dimensional object.

36. The method of claim 35 wherein the medium is a solvent.

37. The method of claim 36 wherein the solvent is isopropyl alcohol.

38. The method of claim 37 wherein the ultrasonic stimulation is applied for at least about 30 minutes.

39. The method of claim 35 wherein the biocompatible three-dimensional object is a hearing aid shell.

40. A method of forming and detoxifying a three-dimensional object formed by solid freeform fabrication, the object being detoxified for at least long-term dermal contact biocompatibility, the method comprising:
   forming a preliminary object in successive layers with a build material in a layerwise fashion, the preliminary object containing cytotoxins;
   subjecting the preliminary object to chemical extraction in a medium for a sufficient period of time so as to nullify the cytotoxins in the preliminary object and thereby establish a biocompatible three-dimensional object.

41. The method of claim 40 wherein the medium is a solvent.

42. The method of claim 41 wherein the solvent is isopropyl alcohol.

43. The method of claim 42 wherein the chemical extraction is performed in a soxhlet extractor for more than about 30 minutes.

44. The method of claim 40 wherein the biocompatible three-dimensional object is a hearing aid shell.

45. A method of forming and detoxifying a three-dimensional object formed by solid freeform fabrication, the object being detoxified for at least long-term dermal contact biocompatibility, the method comprising:
   forming a preliminary object in successive layers with a build material in a layerwise fashion, the preliminary object containing cytotoxins;

subjecting the preliminary object to vapor treatment in a medium for a sufficient period of time so as to nullify the cytotoxins in the preliminary object and thereby establish a biocompatible three-dimensional object.

46. The method of claim 45 wherein the medium is water or a solvent.

47. The method of claim 46 wherein the vapor treatment is applied for at least about 5 minutes.

48. The method of claim 47 wherein the medium is steam.

49. The method of claim 48 wherein the temperature of the steam is between about 121° C. and about 124° C. for about 30 minutes.

50. The method of claim 45 wherein the biocompatible three-dimensional object is a hearing aid shell.

* * * * *